United States Patent
Vankieken

(10) Patent No.: US 10,555,352 B2
(45) Date of Patent: Feb. 4, 2020

(54) METHOD FOR THE EXECUTION OF A PAIRING PHASE BY A WIRELESS ACCESS POINT

(71) Applicant: SAGEMCOM BROADBAND SAS, Rueil-Malmaison (FR)

(72) Inventor: Nicolas Vankieken, Rueil Malmaison (FR)

(73) Assignee: SAGEMCOM BROADBAND SAS, Rueil Malmaison (FR)

(*) Notice: Subject to any disclaimer, the term of this patent is extended or adjusted under 35 U.S.C. 154(b) by 236 days.

(21) Appl. No.: 15/533,747

(22) PCT Filed: Dec. 8, 2015

(86) PCT No.: PCT/EP2015/078941
§ 371 (c)(1),
(2) Date: Jun. 7, 2017

(87) PCT Pub. No.: WO2016/091862
PCT Pub. Date: Jun. 16, 2016

(65) Prior Publication Data
US 2017/0339731 A1    Nov. 23, 2017

(30) Foreign Application Priority Data
Dec. 11, 2014    (FR) ..................... 14 62219

(51) Int. Cl.
*H04W 76/14*    (2018.01)
*H04W 48/06*    (2009.01)
(Continued)

(52) U.S. Cl.
CPC ............ *H04W 76/14* (2018.02); *H04W 4/80* (2018.02); *H04W 48/06* (2013.01); *H04W 48/16* (2013.01);
(Continued)

(58) Field of Classification Search
CPC ....... H04W 76/14; H04W 48/16; H04W 4/80; H04W 48/06; H04W 88/08; H04W 84/12; H04W 48/12
See application file for complete search history.

(56) References Cited

U.S. PATENT DOCUMENTS

| 2003/0147424 A1* | 8/2003 | Famolari ................ H04B 1/713 370/503 |
| 2012/0230189 A1* | 9/2012 | Fang ..................... H04W 28/08 370/230 |

(Continued)

FOREIGN PATENT DOCUMENTS

EP    2 528 391 A1    11/2012

OTHER PUBLICATIONS

Feb. 3, 2016 Search Report issued in International Patent Application No. PCT/EP2015/078941.
(Continued)

*Primary Examiner* — Ivan O Latorre
(74) *Attorney, Agent, or Firm* — Oliff PLC; R. Brian Drozd

(57) ABSTRACT

In the context of an execution of a pairing phase for pairing at least one communication device with a wireless access point creating a plurality of cells in distinct respective spectral bands, the wireless access point: obtains a sequencing of the cells created by the access point according to a criterion of occupation of the spectral bands; and activates a systematic authorisation of pairing via each cell during a first predefined duration, of any communication device that so requests, starting from the cell in the least occupied spectral band up to the cell in the most occupied spectral band according to the sequencing obtained, applying a shift in time of a second predefined duration that is at least equal to a period of time statistically necessary for the communi-
(Continued)

cation device to effect the pairing with the wireless access point and which is strictly less than said first predefined period.

11 Claims, 3 Drawing Sheets

(51) Int. Cl.
*H04W 4/80* (2018.01)
*H04W 48/16* (2009.01)
*H04W 48/12* (2009.01)
*H04W 84/12* (2009.01)
*H04W 88/08* (2009.01)

(52) U.S. Cl.
CPC ............ *H04W 48/12* (2013.01); *H04W 84/12* (2013.01); *H04W 88/08* (2013.01)

(56) References Cited

U.S. PATENT DOCUMENTS

2012/0300759 A1* 11/2012 Patanapongpibul .. H04W 48/14
370/338
2015/0148038 A1* 5/2015 Griot ....................... H04W 8/18
455/435.3

OTHER PUBLICATIONS

Robinson et al; "Wi-Fi Simple Configuration Protocol and Usability Best Practices for the Wi-Fi Protected Setup™Program;" Apr. 20, 2011; retreived on May 22, 2014 from: http://www.wi-fi.org/system/files/wsc_best_practices_v2_0_1.pdf; XP055119577.

Configuration Guide for RFMS 3.0 Initial Configuration; "[WiNG 5.1] How-To Guide [Client Load Balancing and Smart Band Control];" 2009 Revision; Jan. 1, 2009; pp. 1-34; retreived on Jul. 29, 2015 from: http://www.michaelfmcnamara.com/files/motorola/WiNG5_Load-Balance_How-to.pdf; XP055205385.

* cited by examiner

METHOD FOR THE EXECUTION OF A PAIRING PHASE BY A WIRELESS ACCESS POINT

FIELD OF THE INVENTION

The present invention relates to a pairing phase for pairing at least one communication device with a wireless access point, the wireless access point being intended to create, by means of a radio communication technology, a plurality of cells in distinct respective spectral bands.

BACKGROUND

The use of wireless local area networks (WLANs) offers great flexibility for the users of communication devices such as computers, tablets, smartphones, etc. In order not to enable any communication device to connect to a WLAN network and to have access to data exchanges occurring via the WLAN network, security protocols are implemented. Ensuring the security of the WLAN network must however not be done to the detriment of simplicity of configuration.

For example, in the context of a Wi-Fi (registered trade mark) network, the WPS ("Wi-Fi protected setup") protocol can be used. The aim of the WPS protocol is that the configuration phase for protecting a Wi-Fi network should be simple, and therefore accessible to users without any special knowledge of communication network configuration. The WPS protocol proposes at least three ways of enabling a communication device to pair with a wireless access point (WAP), that is to say to recover from said wireless access point WAP encryption keys allowing to communicate in a secured manner in the Wi-Fi (registered trade mark) network: the PIN (personal identification number) pairing procedure, the PBC (push-button configuration) pairing procedure and the NFC (near-field communication) pairing procedure.

The PIN pairing procedure is based on a PIN code supplied by the communication device seeking to connect to a Wi-Fi (registered trade mark) network; this code is then entered by a user via a user interface of the wireless access point WAP. Conversely, it is also possible to enter a PIN code supplied by the wireless access point WAP via a user interface of the communication device seeking to connect to the Wi-Fi (registered trade mark) network. However, in 2011, the researcher Stefan Viehbock revealed an important fault in the PIN pairing procedure, which now makes it non-recommended.

The PBC pairing procedure is based on the fact that the user presses a button, whether it be physical or virtual, both on the wireless point WAP and on the communication device to be connected to the Wi-Fi (registered trade mark) network protected. The PBC pairing procedure is thus such that the wireless access point WAP thus provides, during a period of time of predefined duration and to any communication device making a request for it, a systematic pairing authorisation.

The NFC pairing procedure is based on the fact that the user moves the communication device to be connected to the Wi-Fi (registered trade mark) network close to the WAP access point in order to establish near-field communication. The NFC pairing procedure is thus such that the access point WAP thus provides, to any communication device making a request for it by near-field communication NFC, a systematic pairing authorisation. This solution is particularly practical for small communication devices, e.g. those that are held in the hand.

In the context of PBC and NFC pairing procedures, when the access point WAP creates a plurality of cells according to a plurality of respective spectral bands (e.g. at 2.4 GHz and 5 GHz in the context of Wi-Fi (registered trade mark)) networks, the wireless access point WAP does not have control of the spectral band via which a communication device will seek to pair. Said communication device may then be paired to the wireless access point WAP via a cell that happens to have a less good performance than another cell created by said wireless access point WAP.

SUMMARY

It is desirable to overcome these drawbacks of the prior art. It is also desirable to provide a solution that is simple to implement and allows to support the communication devices compatible with the radio technology of said wireless access point WAP, already available off the shelf.

The invention relates to a method for executing a pairing phase for pairing at least one communication device with a wireless access point creating, by means of a radio communication technology, a plurality of cells in distinct respective spectral bands. The method is such that the wireless access point performs the following steps in the context of said pairing phase: obtaining a sequencing of the cells created by said access point according to a criterion of occupation of said spectral bands; and activating a systematic authorisation of pairing, via each said cell during a first predefined duration, of any communication device that so requests, starting from the cell in the least occupied spectral band up to the cell in the most occupied spectral band according to the sequencing obtained, applying a temporal offset of a second predefined duration that is at least equal to a period of time statistically necessary for the communication device to effect the pairing with the wireless access point and which is strictly less than said first predefined duration. Thus the pairing via a cell with better performance (than at least one other cell created by the wireless access point) is favoured. By adjusting (e.g. in the laboratory) said second duration, the latency caused by the implementation of the temporal offset is minimised.

According to a particular embodiment, in order to obtain said sequencing, the wireless access point effects a collection of information relating to any cell created according to said radio communication technology and detected by said wireless access point in the vicinity of said wireless access point.

According to a particular embodiment, said spectral bands are sequenced according to the quantity of cells, per spectral band, detected in the vicinity of the wireless access point. Thus the sequencing can easily be determined and/or of a quantity of communication channels, per spectral band, used by said cells detected in the vicinity of the wireless access point.

According to a particular embodiment, the wireless access point effects said collection regularly independently of any pairing phase. Thus the pairing phase can start without any additional latency related to said collection.

According to a particular embodiment, the wireless access point associates an access control list with each cell that the wireless access point has created, each access control list being adapted to contain identifiers of communication devices with which the wireless access point prevents communication via the cell with which said access control list is associated, and the wireless access point performs the following step on detection of a successful pairing with a communication device in the context of said pairing phase:

entering an identifier of said communication device in the access control list associated with any cell created by the wireless access point, and belonging to the same communication network as the cell via which said communication device was matched with the wireless access point, and which is less occupied than the cell via which said communication device was paired with the wireless access point according to the sequencing obtained. Thus, during future entries into the coverage area of the wireless access point, said communication device will effect its communications in priority via the cell offering the best performance.

According to a particular embodiment, the sequencing indexing said spectral bands from the least occupied to the most occupied, the access point performs the following step on detection of an updating of said sequencing changing a previous sequencing into a new sequencing: emptying the access control list associated with each cell created in a spectral band which, according to the previous sequencing, has an index higher than or equal to the first index in sequence for which there exists a difference between the previous sequencing and the new sequencing.

According to a particular embodiment, the wireless access point, in the context of a near-field pairing procedure during which the wireless access point systematically transmits a pairing authorisation to any communication device that so requests by near-field communication, exports records representing each cell, said records being presented by the wireless access point according to the sequencing obtained from the least occupied spectral band to the most occupied spectral band. Thus, in effecting the pairing by near-field communication, the cell offering the best performance is favoured.

According to a particular embodiment, said radio communication technology is of the Wi-Fi type, and the wireless access point creates two cells respectively in the spectral bands at 2.4 GHz and 5 GHz as defined in the context of the Wi-Fi radio communication technology.

The invention also relates to a wireless access point intended to execute a pairing phase for pairing at least one communication device with said wireless access point, the wireless access point being intended to create, by means of a radio communication technology, a plurality of cells in distinct respective spectral bands. The wireless access point is such that it implements, in the context of said pairing phase: means for obtaining a sequencing of the cells created by said access point according to a criterion of occupation of said spectral bands; and means for activating a systematic authorisation of pairing via each said cell for a first predefined duration, of any communication device that so requests, starting from the cell in the spectral band least occupied up to the cell in the spectral band most occupied according to the sequencing obtained, by applying a temporal offset of a second predefined duration that is at least equal to a period of time statistically necessary for the communication device to effect the pairing with the wireless access point and which is strictly less than said first predefined duration.

The invention also relates to a computer program that can be stored on a medium and/or downloaded from a communication network in order to be read by a processor. This computer program comprises instructions for implementing the method mentioned above in any of its embodiments when said program is executed by the processor. The invention also relates to storage means comprising such a computer program.

BRIEF DESCRIPTION OF THE DRAWINGS

The features of the invention mentioned above, as well as others, will emerge more clearly from a reading of the following description of an example embodiment, said description being given in relation to the accompanying drawings, among which.

DETAILED DESCRIPTION

The present invention is detailed hereinafter in a context where an access point uses a radio technology able to create a plurality of cells in a wireless communication system, the cells using distinct respective spectral bands (at least two). In a preferred embodiment, the access point uses a radio technology of the Wi-Fi type (registered trade mark) enabling the access point to create a first cell in the spectral band at 2.4 GHz and a second cell in the spectral band at 5 GHz. Such an access point is preferentially integrated in a residential gateway RGW.

Figure 1:
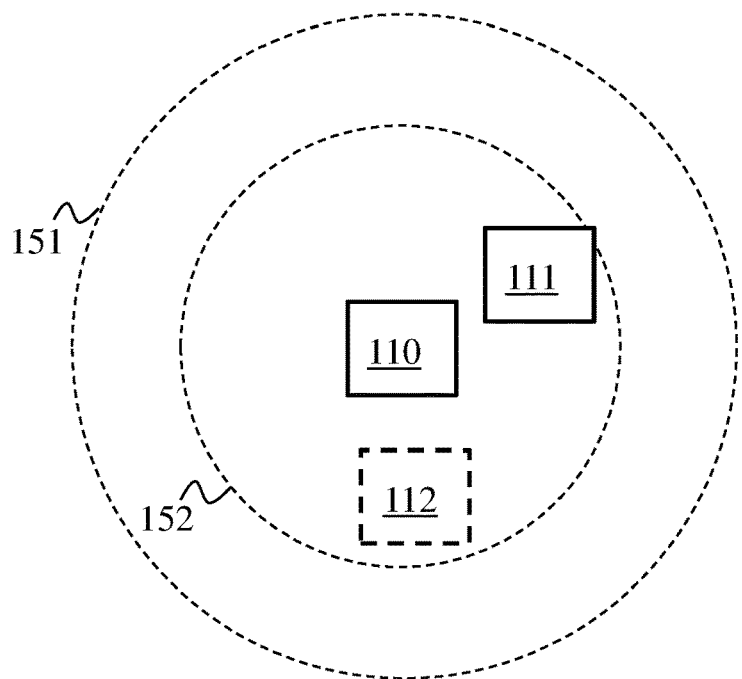
FIG. 1 illustrates schematically a wireless communication system in which the present invention can be implemented.

FIG. 1 illustrates schematically a wireless communication system in which the present invention can be implemented.

The system in FIG. 1 comprises a wireless access point WAP 110, which manages any wireless connection to at least one wireless local network WLAN. An example of hardware architecture of the wireless access point WAP 110 is described hereinafter in relation to FIG. 2.

To enable communication devices to be connected to a WLAN network, the wireless access point WAP 110 has radio interfaces suitable for creating at least two cells 151, 152 using distinct respective spectral bands. The cells created may belong to distinct wireless local networks WLANs, or to the same wireless local network WLAN. The cells created may have different coverage areas. For example, the wireless access point WAP 110 creates a first cell 151 in accordance with the Wi-Fi radio technology in the spectral band at 2.4 GHz (first spectral band) and a second cell 152 in accordance with the Wi-Fi radio technology in the spectral band at 5 GHz (second spectral band).

The wireless access point WAP 110 is responsible for accepting or refusing to connect, to the wireless local network WLAN to which a cell created by said wireless access point WAP 110 belongs, any communication device present in or entering the coverage area of said cell and which so requests. Access to each cell, and therefore to the wireless local network WLAN to which said cell belongs, is protected in that, outside phases of pairing and initialisation of the connection to said wireless local network WLAN, the communications are encrypted. Said communication device and the wireless access point WAP 110 must then effect a pairing phase aimed at communicating encryption keys enabling the secure access to be implemented.

FIG. 1 shows a first communication device 111 paired with the wireless access point WAP 110, and a second communication device 112 that a user wishes to pair with the wireless access point WAP 110. The first communication device 111 is for example a computer, a tablet or a smartphone. The second communication device 112 is also for example a computer, a tablet or a smartphone. The procedure implemented by the wireless access point WAP 110 in the context of a pairing with a communication device is described below in relation to FIG. 4, and an information-collection procedure to enable said pairing procedure is described below in relation to FIG. 3. Furthermore, a procedure for exporting records of said cells via a near-field communication (NFC) technology is described below in relation to FIG. 7.

To create each cell, the wireless access point WAP 110 typically transmits corresponding beacon signals affording synchronisation with the communication devices wishing to access the wireless local network WLAN to which said cell belongs. Such beacon signals include in particular an identifier of the wireless local network WLAN to which said cell belongs. According to the Wi-Fi (registered trade mark) radio technology, this identifier is called an SSID (service set identifier). When a plurality of cells using distinct respective spectral bands are created by the access point WAP 110 for the same wireless local network WLAN, beacon signals respectively transmitted for said cells therefore include the same wireless local network WLAN identifier, e.g. the same SSID.

In the wireless access point WAP 110, each cell created by said wireless access point WAP 110 can be associated with an access control list ACL that stores identifiers, e.g. MAC (medium access control) addresses, of communication devices that are not entitled to access, via said cell, the wireless local network WLAN to which said cell belongs. Each communication device having an identifier present in the wireless local network WLAN associated with a cell can however access the wireless local network WLAN to which said cell belongs, but via another cell belonging to said wireless local network WLAN. Algorithms manipulating such access control lists ACLs are presented below in relation to FIGS. 5 and 6.

Figure 2:
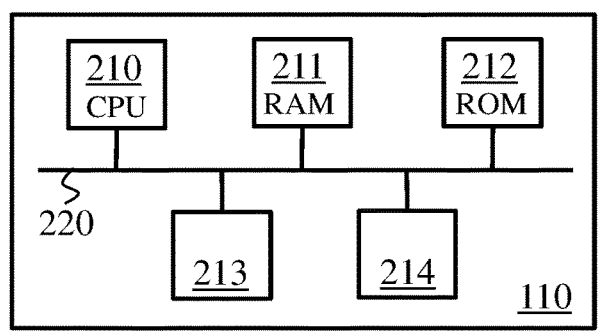
FIG. 2 illustrates schematically an example of hardware architecture of an access point of said wireless communication system.

FIG. 2 illustrates schematically an example of hardware architecture of the wireless access point WAP 110.

The wireless access point WAP 110 then comprises, connected by a communication bus 220: a processor or CPU (central processing unit) 210; a random access memory (RAM) 211; a read only memory (ROM) 212; a storage unit or a storage medium reader, such as an SD (secure digital) card reader or hard disk HDD (hard disk drive) 213; and a plurality 214 of radio interfaces enabling the wireless access point WAP 110 to create said cells, to communicate in said cells and to scan spectral bands.

The processor 210 is capable of executing instructions loaded in the RAM 211 from the ROM 212, from an external memory (not shown), from a storage medium or from a communication network. When the wireless access point WAP 110 is powered up, the processor 210 is capable of reading instructions from the RAM 211 and executing them. These instructions form a computer program causing the implementation, by the processor 210, of all or some of the algorithms and steps described below.

Thus all or some of the algorithms and steps described below may be implemented in software form by the execution of a set of instructions by a programmable machine such as a DSP (digital signal processor) or a microcontroller. All or some of the algorithms and steps described below can also be implemented in hardware form by a machine or a dedicated component such as an FPGA (field-programmable gate array) or an ASIC (application-specific integrated circuit).

Figure 3:
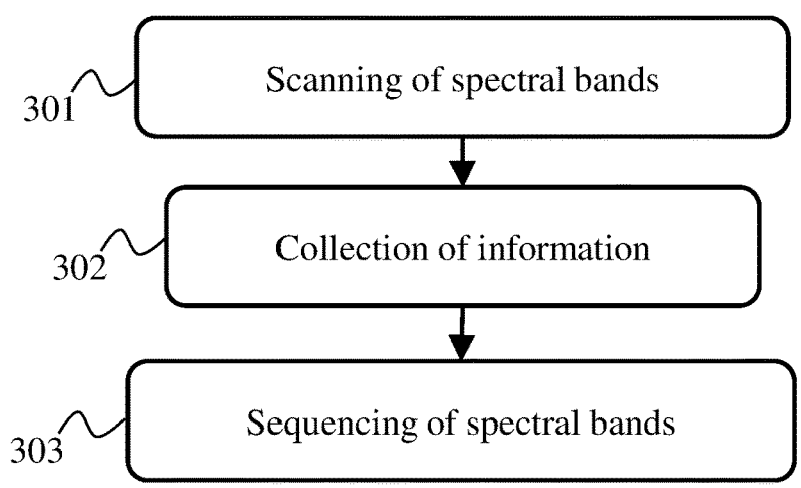
FIG. 3 illustrates schematically an algorithm, implemented by said access point, for obtaining information on the use of spectral bands on which a radio communication technology of said wireless communication system relies.

FIG. 3 illustrates schematically an algorithm implemented by the wireless access point WAP 110 for obtaining information on the use of the spectral bands of the respective cells created by said wireless access point WAP 110.

In a step 301, the wireless access point WAP 110 effects a scan of each of said spectral bands (namely the first and second spectral bands in the preferred embodiment) to evaluate an occupation of said spectral bands.

According to a first example, the wireless access point WAP 110 detects a presence of signals, considered to be interferences, in said spectral bands. The wireless access point WAP 110 can determine in what temporal proportion each communication channel defined by the radio communication technology used is occupied (busy), and what the noise level is for each communication channel. The access point WAP 110 can determine an interference factor for each communication channel, as can be found in monitoring mechanisms used in automatic channel selections ACSs in the Wi-Fi radio communication technology.

According to a second example, which is favoured, the wireless access point WAP 110 detects any cells existing in the vicinity of said wireless access point WAP 110. A cell existing in the vicinity of the wireless access point WAP 110 is a cell created by an access point relying on the same radio communication technology as the wireless access point WAP 110 and the range of the transmitted signals of which reaches said wireless access point WAP 110.

In a following step 302 the wireless access point WAP 110 collects information relating to said cells detected in the vicinity of the wireless access point WAP 110. More particularly, the wireless access point WAP 110 obtains an identifier of each communication network WLAN to which at least one cell detected in the vicinity of the wireless access point WAP 110 belongs. The wireless access point WAP 110 can obtain supplementary information relating to each cell detected in the vicinity of the wireless access point WAP 110, such as for example a frequency hopping sequence and/or transmission channel identifier information, and/or signal power information received coming from the access point creating said cell.

In a following step 303, the access point WAP 110 carries out a sequencing of the various spectral bands on which the cells created by said wireless access point WAP 110 rely, according to a criterion of occupation of said spectral bands according to the information collected at step 302. In the preferred embodiment, the wireless access point WAP 110 therefore carries out a sequencing between the first spectral band and the second spectral band. The sequencing being dependent on the occupation of said spectral bands, said sequencing is dynamic because it may change from one execution of the algorithm in FIG. 3 to another.

As detailed hereinafter, said sequencing defines an order of priority of activation of systematic authorisation of pairing between the cells created by the access point WAP 110, said activations of systematic authorisation of pairing being separated in time by a temporal offset of predefined duration.

In a particular embodiment, said spectral bands are sequenced according to the quantity of cells, per spectral band, detected in the vicinity of the wireless access point WAP 110. The occupation criterion is then said quantity of cells.

In another particular embodiment, said spectral bands are sequenced according to a quantity of channels available according to the transmission channel identifiers and/or frequency hopping sequences used by the wireless access points creating the cells detected in the vicinity of the access point WAP 110. In this case, a spectral band is more available if it has a quantity Q (Q≥2) of such wireless points that occupy the same communication channel as another spectral band occupied by a quantity Q (Q≥2) of such wireless access points that each use a different communication channel. The occupation criterion is then a quantity of communication channels busy (or free) per spectral band. This criterion may be used in addition to the one previously described, namely that the quantity of cells per spectral band is first of all examined and, if the spectral bands have the same quantity of cells, the quantity of cells available, per spectral band, is examined.

In yet another particular embodiment, when two spectral bands comprise the same quantity of available channels and/or the same quantity of available channels, the access point WAP 110 carries out the sequencing according to a weighting of signal power information received coming from the wireless access point creating the cells detected in the vicinity of an access point WAP 110: the stronger the signal received, the higher the weight associated with said cell in the vicinity is.

In yet another particular embodiment, the higher the interference factor of a spectral band, the busier said spectral band is considered to be. The occupation criterion is then said interference factor.

The sequencing is preferably carried out by placing the least occupied spectral band at the head, that is to say, in the particular embodiment mentioned above, the spectral band having the lowest quantity of cells detected in the vicinity of the wireless access point WAP 110. This preferred sequencing is particularly useful for presenting records to be exported, as described below in relation to FIG. 7.

Figure 4:
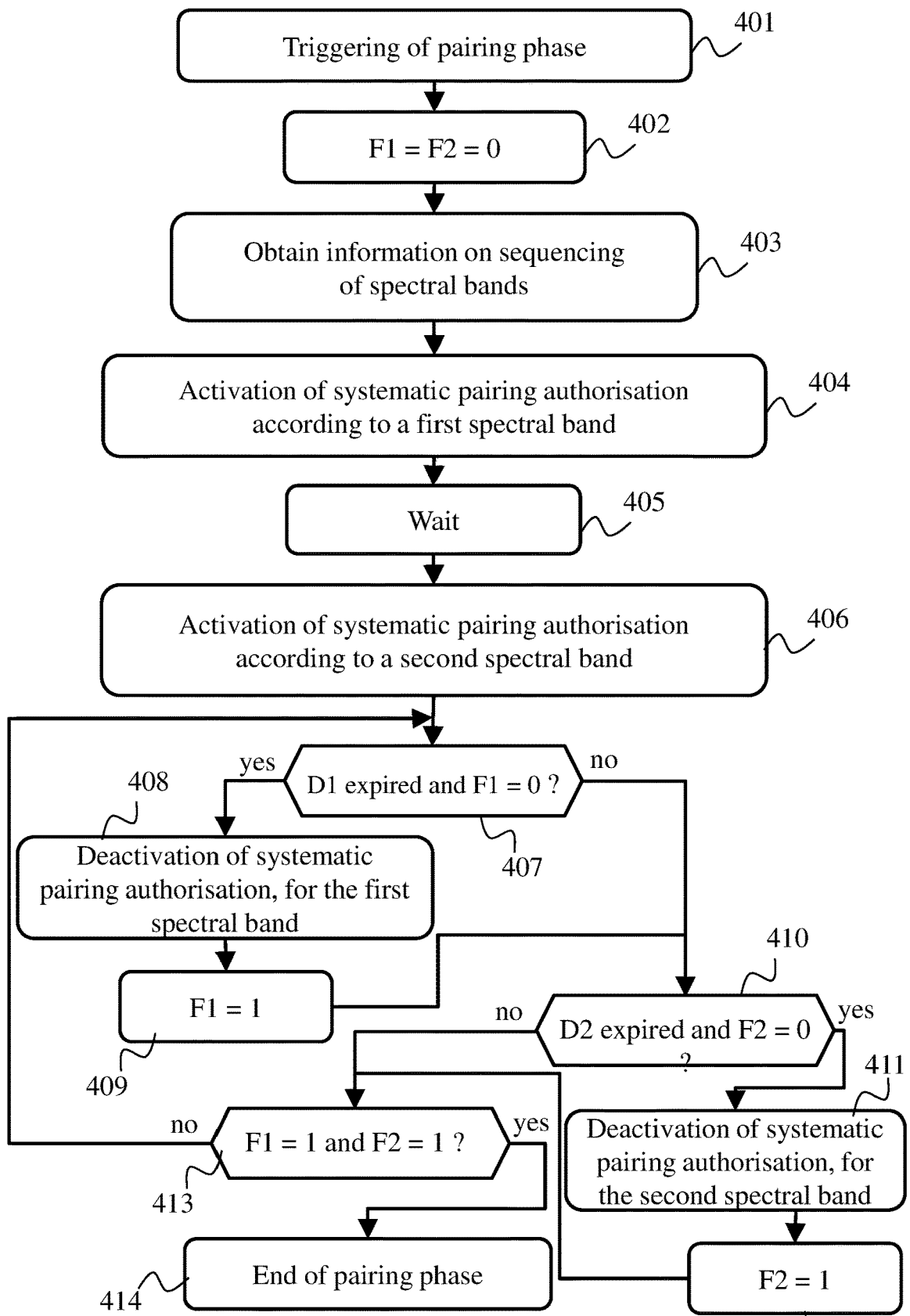
FIG. 4 illustrates schematically an algorithm, used by said access point, for implementing a pairing phase.

FIG. 4 illustrates schematically an algorithm, used by the wireless access point WAP 110, for implementing a pairing phase.

In a step 401, the wireless access point WAP 110 detects a triggering of a pairing phase. For example, the wireless access point WAP 110 detects that a user presses on a dedicated button of a man-machine interface of the wireless access point WAP 110. It is the principle of triggering of the conventional pairing procedure PBC already mentioned (i.e. a pairing procedure PBC that does not take account of the dynamic sequencing of cells). For example, the wireless access point WAP 110 may be such that a single press on said button triggers the execution of the algorithm in FIG. 4, whereas a double press (two successive pressings in a period of time of predefined maximum duration) triggers the execution of the conventional pairing procedure PBC. Other approaches may lead the wireless access point WAP 110 to trigger a pairing phase, such as for example the reception of a particular command from a device already connected to a wireless communication network WLAN via one of the cells created by the wireless access point WAP 110.

In a following step 402, the wireless access point WAP 110 initialises two variables F1 and F2 to "0". These variables F1 and F2 serve to indicate whether the wireless access point WAP 110 has deactivated a systematic pairing authorisation for respectively the first and second spectral bands, i.e. via respectively the cells created by the wireless access point WAP 110 in the first and second spectral bands.

In a following step 403, the wireless access point WAP 110 obtains information on sequencing of the first and second spectral bands. This information results from the scanning of the spectral bands, as already described in relation to FIG. 3. For example, the wireless access point WAP 110 requires such a scanning of the spectral bands to be carried out in the context of the pairing phase triggered at step 401. This does however give rise to a certain latency in execution of said pairing phase, which may be unpleasant from the point of view of the user. A favoured embodiment is therefore to carry out the scanning of the spectral bands as a background task, regularly (in order to detect appearances and disappearances of cells in the vicinity), independently of any pairing phase. Thus the wireless access point WAP 110 has sequencing information at the time when the pairing phase is triggered.

In a following step 404, the wireless access point WAP 110 activates the systematic pairing authorisation via the cell created by the wireless access point WAP 110 in the least occupied spectral band (among the first and second spectral bands) according to the sequencing obtained at step 403. In other words, any communication device making a pairing request via said cell receives, systematically, an authorisation from the wireless access point WAP 110. The wireless access point WAP 110 activates the pairing authorisation via said cell, for a period D1. For example, the period D1 is equal to two minutes.

In a following step 405, the wireless access point WAP 110 performs a step of waiting for a predefined period T. The period T is non-zero and strictly less that the period D1. The period T is such that it enables, from a statistical point of view, a communication device awaiting pairing to initiate the pairing with said wireless access point WAP 110 via the least occupied spectral band according to the sequencing obtained at step 403.

In a following step 406, the wireless access point WAP 110 activates the systematic pairing authorisation via the cell created by the access point WAP 110 in the most occupied spectral band (among the first and second spectral bands) in accordance with the sequencing obtained at step 403. In other words, any communication device making a pairing request via said cell receives, systematically, an authorisation from the wireless access point WAP 110. The wireless access point WAP 110 activates the pairing authorisation via said cell for a period D2 that is preferentially equal to the period D1. For example, the period D2 is also equal to two minutes.

In a following step 407, the wireless access point WAP 110 checks whether the period D1 has expired and whether the variable F1 is equal to "1". If the period D1 has not expired and/or if the variable F1 is still equal to "0", a step 410 is performed; otherwise a step 408 is performed.

In step 408, the wireless access point WAP 110 deactivates the systematic pairing authorisation via the cell created by the access point WAP 110 in the least occupied spectral band (among the first and second spectral bands) in accordance with the sequencing obtained at step 403. In other words, any communication device making a pairing application via said cell receives, systematically, a refusal from the wireless access point WAP 110. Then, in a step 409, the wireless access point WAP 110 sets the variable F1 to "1", and then performs step 410.

In step 410, the wireless access point WAP 110 checks whether the period D2 has expired and whether the variable F2 is equal to "1". If the period D2 has not expired and/or if the variable F2 is still equal to "0", a step 413 is performed; otherwise a step 411 is performed.

In step 411, the wireless access point WAP 110 deactivates the systematic pairing authorisation via the cell created by the access point WAP 110 in the most occupied spectral band (among the first and second spectral bands) in accordance with the sequencing obtained at step 403. In other words, any communication device making a pairing application via said cell receives, systematically, a refusal from the wireless access point WAP 110. Then, in a step 412, the wireless access point WAP 110 sets the variable F2 to "1" and then performs step 413.

In step 413, the wireless access point WAP 110 checks whether the variable F1 is equal to "1" and whether the variable F2 is equal to "1". If the variables F1 and F2 are both equal to "1", the pairing phase is ended in a step 414; otherwise step 417 is repeated.

The algorithm in FIG. 4 describes an algorithm for implementing a pairing phase, according to two distinct spectral bands. The same principles are applied when there are a larger number of distinct spectral bands. In other words, the wireless access point WAP 110 activates a systematic authorisation for pairing, via each cell for a first predefined period (D1; D2), of any communication device that so requests, starting from the cell in the least occupied spectral band up to the cell in the most occupied spectral band in accordance with the sequencing obtained at step 403, applying a temporal offset of a second predefined duration (T) that is at least equal to a period of time statistically necessary for the communication device to effect the pairing with the wireless access point and which is strictly less than said first predefined period (D1; D2).

Figure 5:
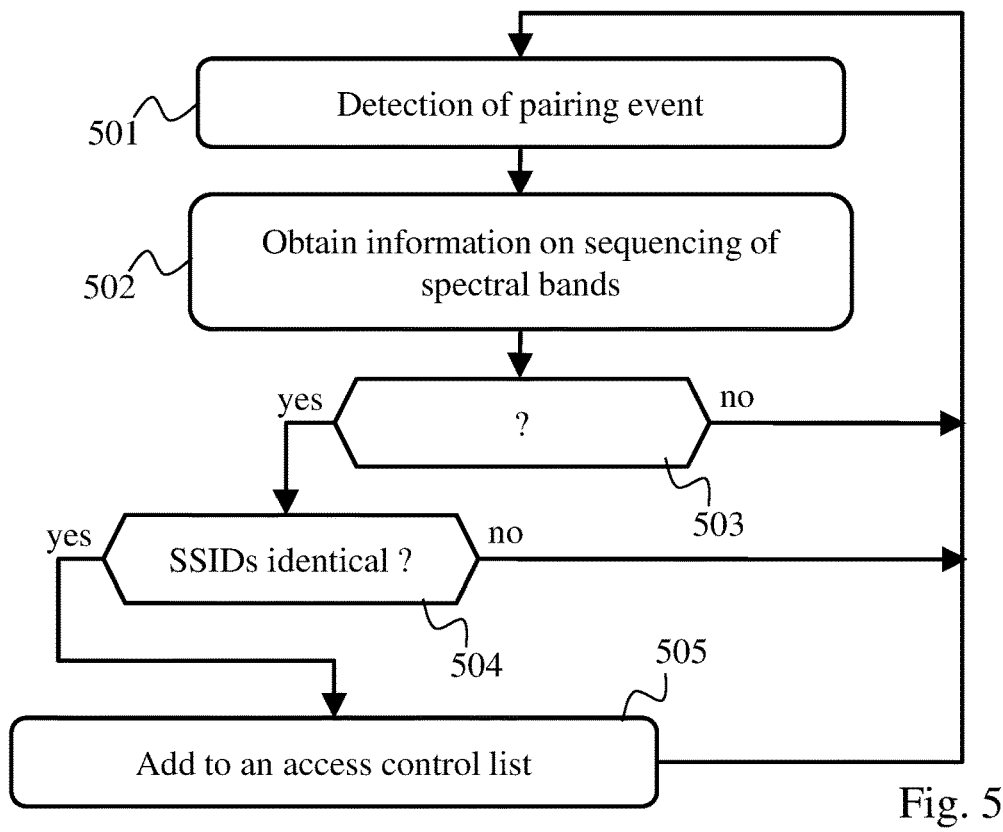
FIG. 5 illustrates schematically a first algorithm, used by said access point, for updating the access control list.

FIG. 5 illustrates schematically a first algorithm, implemented by the wireless access point WAP 110, for updating the access control list ACL.

In a step 501, the wireless access point WAP 110 detects an event of pairing of a communication device with said wireless access point WAP 110. Said communication device is therefore newly paired with the wireless access point WAP 110. The pairing event results from a pairing success when the access point WAP 110 has activated the systematic paring authorisation via at least one of the cells created by the access point WAP 110, as in the context of the algorithm in FIG. 4.

In a following step 502, the wireless access point WAP 110 obtains information on sequencing of the first and second spectral bands. This information results from the scanning of said spectral bands, as already described in relation to FIG. 3.

In a following step 503, the wireless access point WAP 110 checks whether the pairing was carried out via the cell in the least occupied spectral band (among the first and second spectral bands) in accordance with the sequencing obtained at step 502. If such is the case, a step 504 is performed; otherwise the wireless access point WAP 110 once again awaits a new pairing event and repeats step 501.

In step 504, the wireless access point WAP 110 checks whether the first and second spectral bands correspond to the same communication network WLAN, that is to say checks whether the same communication network identifier WLAN is broadcast in the cells respectively created by said wireless access point WAP 110 on said spectral bands. According to the Wi-Fi (registered trade mark) radio technology, the wireless access point WAP 110 checks whether the same identifier SSID is broadcast in the beacons of said cells. If such is the case, a step 505 is performed; otherwise the wireless access point WAP 110 once again awaits a new pairing event and repeats step 501.

In step 505, the wireless access point WAP 110 adds an identifier of the newly paired communication device to the access control list ACL associated with the cell created by the access point WAP 110 in the most occupied spectral band (among the first and second spectral bands) in accordance with the sequencing obtained at step 502. Then the wireless access point WAP 110 once again awaits a new pairing event and repeats step 501.

It should be noted that the wireless access point WAP 110 may in a variant implement the algorithm in FIG. 5 only in the case where the first and second spectral bands correspond to the same communication network WLAN; in this case, the wireless access point WAP 110 does not have to perform step 504 and the algorithm passes directly from step 503 to step 505 when the pairing has been carried out via the cell in the least occupied spectral band (among the first and second spectral bands) in accordance with the sequencing obtained at step 502.

The algorithm in FIG. 5 describes an algorithm for updating an access control list ACL when two distinct spectral bands are used by the access point WAP 110 in order to respectively create said cells. The same principles are applied when there are a larger number of distinct spectral bands. In other words, the access point WAP 110 enters the identifier of the newly paired communication device in the access control list associated with any cell created by the wireless access point and belonging to the same communication network as the cell via which said communication device was paired with the wireless access point and which is less occupied than the cell via which said communication device was paired with the wireless access point in accordance with the sequencing obtained at step 502.

Figure 6:
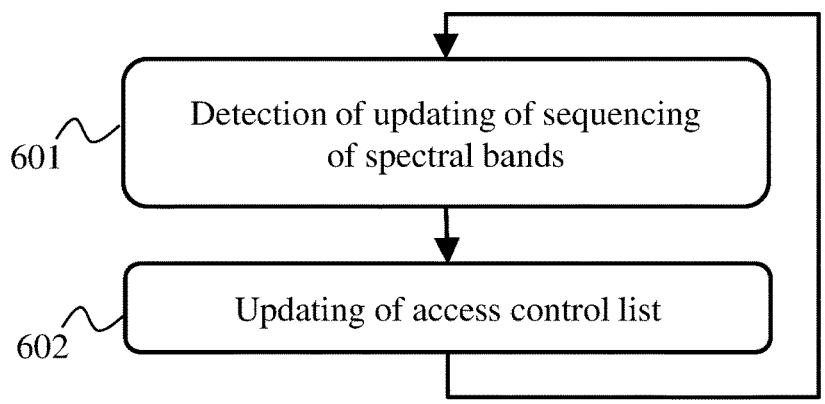
FIG. 6 illustrates schematically a second algorithm, used by said access point, for updating the access control list.

FIG. 6 illustrates schematically a second algorithm, used by said wireless access point WAP 110, for updating the access control list ACL.

In a step 601, the wireless access point WAP 110 detects an updating of sequencing of the first and second spectral bands, that is to say a new sequencing of the first and second spectral bands has been established and a previous sequencing (if such exists) of the first and second spectral bands has become obsolete.

In a step 602, the wireless access point WAP 110 removes, from the access control list ACL associated with the most occupied cell (among the first and second spectral bands) in accordance with the previous sequencing and which is now the least occupied cell (among the first and second spectral bands) according to the new sequencing, each identifier that was added to said access control list ACL by execution of the algorithm in FIG. 5 in the context of the previous sequencing. It should be noted that the access control list ACL associated with a cell that appeared to be the least occupied (among the first and second spectral bands) according to the previous sequencing, and which is now the most occupied (among the first and second spectral bands) in accordance with the new sequencing, was empty at the time of establishment of the new sequencing.

Each access control list ACL associated with a cell created by the wireless access point WAP 110 can be merged with an access control list associated with the wireless communication network WLAN with which said cell is associated. Such an access control list associated with a wireless communication network WLAN is known to persons skilled in the art of the management of access to wireless communication networks WLAN, and allows to prevent access (at least over predetermined time ranges) to said communication network WLAN for communication devices the respective identifiers of which are entered in said list. When each access control list ACL associated with a cell created by the wireless access point WAP 110 is merged with an access control list associated with the wireless communication network WLAN with which said cell is associated, the wireless access point WAP 110 stores the communication device identifier at step 505 in association with an identifier of the most occupied cell (among the first and second spectral bands) in accordance with the sequencing obtained at step 502. Thus the wireless access point WAP 110, in step 602, removes from the access control list associated with a communication network WLAN the communication device identifiers that are associated with the identifier of the cell that is now the least occupied cell (among the first and second spectral bands) according to the new sequencing.

The algorithm in FIG. 6 describes an algorithm for updating an access control list ACL when two distinct spectral bands are used by the access point WAP 110 in order respectively to create said cells. The same principles are applied when there are a larger number of distinct spectral bands. In other words, the sequencing indexing said spectral bands from the least occupied to the most occupied, the access point WAP 110 empties the access control list ACL associated with each cell created in a spectral band which, according to the previous sequencing, has an index higher than or equal to the first index in a sequence for which there exists a difference between the previous sequencing and the new sequencing.

Figure 7:
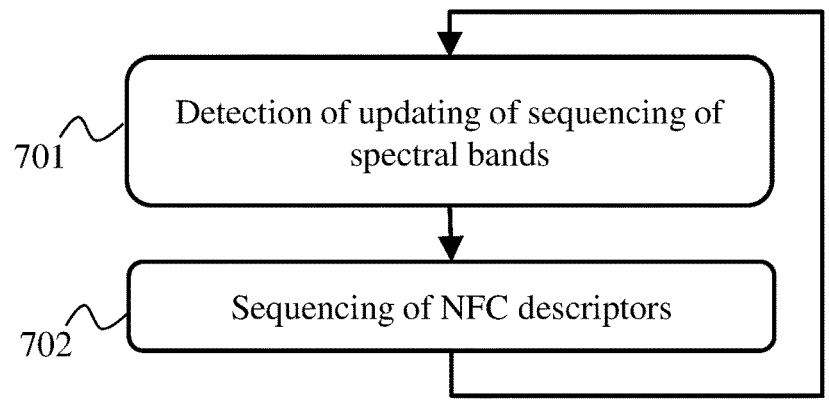
FIG. 7 illustrates schematically an algorithm, used by said access point, for updating records.

FIG. 7 illustrates schematically an algorithm, used by said access point, for updating records. Such records are used in the context of the NFC pairing procedure already mentioned and in which the wireless access point WAP 110 systematically transmits a pairing authorisation to any communication device that so requests by near-field communication.

In a step 701, the wireless access point WAP 110 detects an updating of sequencing of the first and second spectral bands, that is to say a new sequencing of the first and second spectral bands has been established and a previous sequencing (if such exists) of the first and second spectral bands has become obsolete.

In a following step 702, the wireless access point WAP 110 obtains NDEF ("NFC data exchange format") records respectively representing cells created by the wireless access point WAP 110. Each NDEF record indicates in particular the spectral band in which the cell represented by said record was created by the wireless access point WAP 110. Each NDEF record also indicates an identifier of the communication network WLAN to which said cell belongs. Each NDEF record also provides the encryption keys to be applied for communicating in the communication network WLAN via said cell.

During step 702, the wireless access point WAP 110 sequences the records obtained, in accordance with the new sequencing. Thus the wireless access point WAP 110 sequences the records from the least occupied of the spectral bands in which the wireless access point WAP 110 created respective cells to the most occupied of said spectral bands. The wireless access point WAP 110 exports said records in accordance with the sequencing, the record of the least occupied of the spectral bands then appearing first. This exporting is carried out by the wireless access point WAP 110 by the sending of a message of the "connection handover select" type, as standardised by the "NFC Forum" body, in the context of an NFC pairing procedure. Said records therefore appear in accordance with said sequencing in the message of the "connection handover select" type.

Thus a communication device receiving said message of the "connection handover select" type being supposed to attempt to perform the pairing with the wireless access point WAP 110 while respecting the order in which the cells created by the wireless access point WAP 110 are described in said message, the cell created in the least occupied of the spectral bands is favoured It should be noted that the sequencing of the records in the context of an NFC pairing procedure could be implemented without account being taken of said sequencing during a pairing procedure of the PBC type.

The invention claimed is:

1. A method for executing a pairing phase for pairing at least one communication device with a wireless access point creating, by means of a radio communication technology, a plurality of cells in distinct respective spectral bands, wherein the wireless access point performs the following steps in the context of said pairing phase:

obtaining a sequencing of the cells created by said access point according to a criterion of occupation of said spectral bands; and activating a systematic authorisation of pairing via each said cell during a first predefined duration, of any communication device that so requests, starting from the cell in the least occupied spectral band up to the cell in the most occupied spectral band according to the sequencing obtained, applying a temporal offset of a second predefined duration that is at least equal to a period of time statistically necessary for the communication device to effect the pairing with the wireless access point and which is strictly less than said first predefined duration.

2. The method according to claim 1, wherein, in order to obtain said sequencing, the wireless access point effects a collection of information relating to any cell created according to said radio communication technology and detected by said wireless access point in the vicinity of said wireless access point.

3. The method according to claim 2, wherein said spectral bands are sequenced according the quantity of cells, per spectral band, detected in the vicinity of the wireless access point and/or a quantity of communication channels, per spectral band, used by said cells detected in the vicinity of the wireless access point.

4. The method according to claim 2, wherein the wireless access point effects said collection regularly independently of any pairing phase.

5. The method according to claim 1, wherein the wireless access point associates an access control list with each cell that the wireless access point has created, each access control list being adapted to contain identifiers of communication devices with which the wireless access point prevents communication via the cell with which said access control list is associated, and the wireless access point performs the following step on detection of a successful pairing with a communication device in the context of said pairing phase:

entering an identifier of said communication device in the access control list associated with any cell created by the wireless access point, and belonging to the same communication network as the cell via which said communication device was matched with the wireless access point, and which is less occupied than the cell via which said communication device was paired with the wireless access point according to the sequencing obtained.

6. The method according to claim 5, wherein, the sequencing indexing said spectral bands from the least occupied to the most occupied, the access point performs the following step on detection of an updating of said sequencing changing a previous sequencing into a new sequencing:

emptying the access control list associated with each cell created in a spectral band which, according to the previous sequencing, has an index higher than or equal to the first index in sequence for which there exists a difference between the previous sequencing and the new sequencing.

7. The method according to claim 1, wherein the wireless access point, in the context of a near-field pairing procedure during which the wireless access point systematically transmits a pairing authorisation to any communication device that so requests by near-field communication, exports records representing each cell, said records being presented by the wireless access point according to the sequencing obtained from the least occupied spectral band to the most occupied spectral band.

8. The method according to claim 1, wherein said radio communication technology is of the Wi-Fi type, and in that the wireless access point creates two cells respectively in the spectral bands at 2.4 GHz and 5 GHz as defined in the context of the Wi-Fi radio communication technology.

9. A computer program product embodied in a non-transitory storage medium, the computer program product comprising instructions for the implementation, by a processor of a wireless access point, of the method according to claim 1, when said program is executed by said processor.

10. A non-transitory storage means storing a computer program containing instructions for the implementation, by a processor of a wireless access point, of the method according to claim 1, when said program is executed by said processor.

11. A wireless access point intended to execute a pairing phase for pairing at least one communication device with said wireless access point, the wireless access point being intended to create, by means of a radio communication technology, a plurality of cells in distinct respective spectral bands, wherein the wireless access point comprises electronics circuitry that implements, in the context of said pairing phase:
  obtaining a sequencing of the cells created by said access point according to a criterion of occupation of said spectral bands; and
  activating a systematic authorisation of pairing via each said cell for a first predefined duration, of any communication device that so requests, starting from the cell in the spectral band least occupied to the cell in the spectral band most occupied according to the sequencing obtained, by applying a temporal offset of a second predefined duration that is at least equal to a period of time statistically necessary for the communication device to effect the pairing with the wireless access point and which is strictly less than said first predefined duration.

* * * * *